June 23, 1970 R. G. KNIGHT ET AL 3,517,133

FOUR WIRE TELEPHONE SYSTEM USING PHANTOM SIGNALING CIRCUIT

Filed July 20, 1966

United States Patent Office 3,517,133
Patented June 23, 1970

3,517,133

FOUR WIRE TELEPHONE SYSTEM USING PHANTOM SIGNALING CIRCUIT

Ronald George Knight, John Anthony Weeks Butcher, Geoffrey George Pullum and Michael John Willson, London, England, assignors to International Standard Electric Corporation, New York, N.Y., a corporation of Delaware Filed July 20, 1966, Ser. No. 566,640
Claims priority, application Great Britain, July 26, 1965, 31,807/65
Int. Cl. H04m 19/02
U.S. Cl. 179—18 8 Claims

ABSTRACT OF THE DISCLOSURE

A four wire telephone line uses phantom circuits for signalling between exchange and subscribers. Signalling uses reversible D.C. currents so that the phone can be rung while the sub-set is off-hook.

The present invention relates to automatic telecommunication exchange system and to equipment for use in such systems.

In certain cases it is desirable to use four-wire line circuits in telecommunication exchange systems, and the need exists (as in all telecommunication exchange systems) for the conveyance of signals between subscriber's stations and the exchange. These signals include, inter alia, the calling condition, dialled impulses, and the ringing signal.

An object of the invention is to provide for signalling in an exchange system in which four-wire line circuits are used.

According to the present invention there is provided an automatic telecommunication exchange system, in which subscriber stations are each connected to the exchange in four-wire manner, there being a two-wire connection (hereinafter called the "go path") for intelligence passing from the exchange to the subscriber station and a two-wire connection (hereinafter called the "return path") for intelligence passing from the subscriber station to the exchange, in which each subscriber station is coupled to its two two-wire connections via transformers and the exchange is also coupled to said two wire connections via transformers, and in which a phantom circuit is provide over said two-wire connections for the conveyance of signalling conditions between the respective subscriber station and the exchange.

An embodiment of the invention will now be described with reference to the accompanying drawing, in which:

FIG. 1 shows a line circuit at a telephone exchange, while

FIG. 2 shows part of a four-wire subscriber's station.

Figures 1, 2:
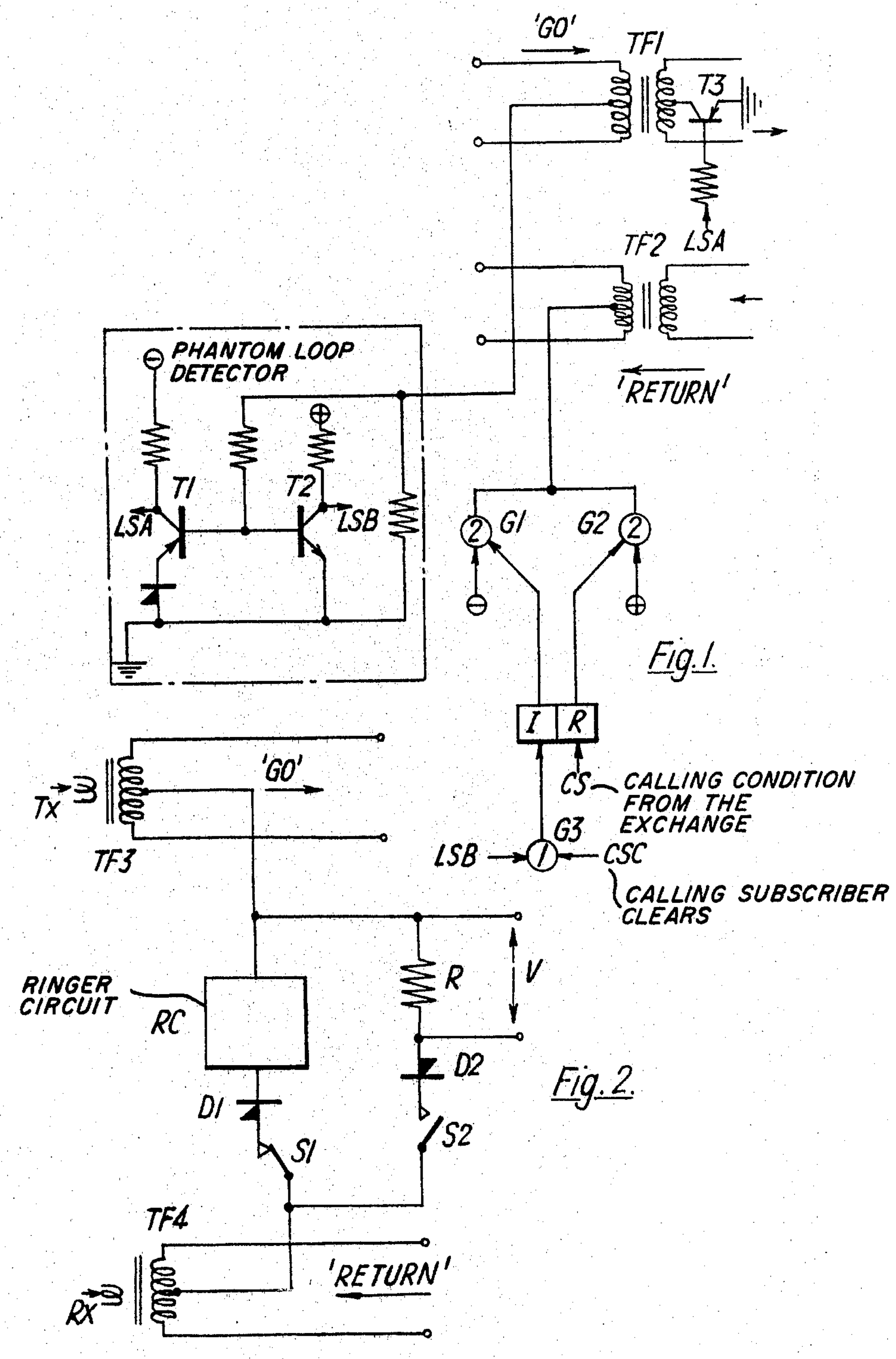

In FIG. 1, which is a subscriber's line circuit at the exchange end of a four-wire line, the "go" channel is coupled in to the exchange via a transformer TF1 and the "return" channel is fed from the exchange via a further transformer TF2. To the centre-tap of the primary of the transformer TF1 there is connected a phantom loop detector consisting of a pnp transistor T1 and an npn transistor T2. Logic circuitry is connected to the centre tap of the other transformer TF2, which logic circuitry includes three gates and a bistable.

The subscriber's station, FIG. 2 includes two transformers TF3 and TF4, a ringer circuit RC and two switch-controlled paths. The switches S1 and S2 in those paths, although shown as contacts, at least S1 would in practice be of electronic nature such as a controlled transistor switch.

During the line idle condition, when the subscriber's handset is on hook, bistable I–R at the exchange has its I side operated, so gate G1 is open. This maintains the "return" phantom negative with respect to the "go" phantom. When the subscriber is called from the exchange, the bistable is set to its R condition via the input CS, which closes gate G1 and opens a gate G2, so that the "return" phantom is now positive with respect to the "go" phantom. With the "return" phantom positive, diode D1 at the subscribers station can conduct so an effective loop is set up via switch S1 and the ringer circuit RC. Hence the latter operates to notify the called subcriber, either audibly or visually or both, that he is wanted.

The detection circuit T1–T2 detects the presence of a loop, and since in this case as it is a positive loop, transistor T2 operates so that its output LSB goes negative due to current in the collector resistor of T2. This indicates to the control circuitry that the called line is idle but is being called. When the called subscriber replies the positive loop is broken at S1, which opens briefly when the handset is lifted, so LSB goes positive. This, via the gate G3, resets the bistable to I. Hence the "return" phantom is again negative to the "go" phantom.

Considering mainly the subscriber's station, in the idle (on hook) state, switch S1 is closed and switch S2 is open, where as when the handset is off hook S1 and S2 are both closed, so that current flows via resistor R, diode D2 and switch S2 (the "return" phantom then being negative). Therefore a voltage is developed across R which can be used to supply powder to ther circuits in the subscriber station if required. The action of operating S2 on lifting the handset causes S1 to open for a short period, e.g. 100 ms., which (as mentioned in the preceding paragraph) is detected by T1–T2 as the called subscriber reply condition.

In the idle state, in which I–R is in its I condition, with the "return" phantom negative with respect to the "go" phantom, since S2 is open no loop condition exists at the subscriber's station. As already mentioned, if a call is to be directed to the station the return phantom is made positive, so that the loop is rendered effective via S1 and D1. The subscriber's reply causes the opening of S1 which is noted as the called line reply condition.

When the subscriber wishes to make a call, S2 is operated by the lifting of the handset (or by a special calling switch) and remains closed for the duration of the call, so a phantom loop condition exists. As the "return" phantom is negative to the "go" phantom the opening and re-closing of S1 (due to the operation of S2) has no effect at this time. At the exchange the closure of the phantom loop causes negative to appear at the commoned bases of T1 and T2, so T1 conducts. This is interpreted firstly as a calling condition and then as an off hook condition. The initial operation of T1 is followed by the operation of a further transistor T3, which applies a forward marking to the switching equipment (not shown).

When the caller dials, the dialled digits are detected and the results of the detection are used for call control and establishment. The dialling signals are received over the "go" channel, this being prepared by a gate controlled from LSA.

When the call ends, and the caller hangs up, his contact S2 opens, which indicates the line idle—absence of loop—condition to the exchange. Hence the LSA output disappears, and this causes the connection to be cleared down. One consequence of the calling subscriber clearing first, at the end of the call is a positive pulse on the CSC (calling subscriber clears) input of gate G3. This pulse occurs via means (not shown) which sets the bistable to I and resets the return look to negative by opening gate G1.

As already mentioned with special reference to FIG. 1, when the station is called from the exchange, the phantom potential is reversed and loop current flows in the opposite direction via S1, D1 and RC. This loop current operates RC (either direct or via amplifiers) to notify the subscriber that he is called. In addition, as already mentioned, the "called" potential loop is detectable at the exchange by T1–T2.

When the called subscriber replies, S2 is operated, S1 being briefly opened. The opening of S1 breaks the "called" potential loop on the phantom, which is detected by the exchange and causes the phantom to be reverted to its normal (i.e. negative) potential condition. Thus ring trip is effected and speech between the parties is possible.

Next, consider the situation where a customer fails to hang up properly. In such a case, the rest of the call is cleared, but the line is unable to receive a call until he clears properly. If called, he would not know he is being called.

In greater detail, if the subscriber fails to clear at the end of the call, the clearing of the other party causes the cross-office switched path used for the connection to be cleared. In this case the subscriber, who is off hook but not in communication, is said to be "parked." To make a further call, the parked subscriber must clear and then re-seize the line to the exchange. However, by simply reversing the phantom potential the subscriber can be called in the normal way. The reason for this is that S1 is then closed so that the subscriber station end of the positive loop is completed via S1, D1 and RC. To accept such a call the subscriber must first clear, and then re-seize the line to the exchange, which latter effects ring trip. The action of clearing removes the negative loop condition from the subscriber station since it opens S2, and then by re-seizing ring trip is effected as before.

It is to be understood that the foregoing description of specific examples of this invention is made by way of example only and is not to be considered as a limitation on its scope.

What we claim is:

1. An automatic telecommunication exchange system, in which subscriber stations are each connected to the exchange in four-wire manner, there being a two-wire connection for intelligence passing from the subscriber station to the exchange and a two-wire connection for intelligence passing from the exchange to the subscriber station, in which each subscriber station is coupled to its two two-wire connections via transformers and the exchange is also coupled to said two wire connections via transformers, and in which a phantom circuit is provided over said two-wire connections for the conveyance of signalling conditions between the respective subscriber station and the exchange, said phantom circuit comprising a loop extending to the subscriber station via two separate paths, each of which includes a diode, the diodes in said two paths being oppositely poled, each of said paths including a switch, the switch in the first of said paths being normally closed and the switch in the second of said paths being normally open, so that a loop exists over the phantom circuit for a current in one direction only, signals being applied to the phantom circuit at the exchange end to cause current to flow in said one direction when a call is directed to that station as a called station.

2. An exchange system as claimed in claim 1, and means responsive ot the answer of the subscriber at the called station for opening the switch in said first path for a short period and also for closing the switch in said second path, so that a loop exists over the phantom circuit for current in the other direction only, so that the loop passes current in said other direction only for said short period, and means for closing both switches after said short period to pass current of either polarity, and means whereby the interruption of the loop for current in said one direction due to the opening of said switch in said first path is detected at the exchange as a called party reply condition.

3. An exchange system as claimed in claim 2, in which said first path includes indication means adapted when said loop via said first path is complete to indicate a calling condition at the subscriber station.

4. An exchange system as claimed in claim 3, in which said second path includes a resistor across which a voltage is developed when the loop via said second path is effective, which voltage energizes circuit elements in the subscriber station.

5. An exchange system as claimed in claim 1, in which at the exchange end a phantom loop detector is connected to one end of said phantom circuit, which detector detects whether said loop is passing current in said first or said second direction.

6. An exchange system as claimed in claim 5, in which said phantom loop detector consists of two transistors to whose bases said one end of said phantom circuit is coupled, one of said transistors being a pnp transistor and the other being an npn transistor, so that the direction of current in said phantom circuit determines which transistor responds.

7. An exchange system as claimed in claim 6, in which two current sources are provided, means for connecting one of said sources to the other end of said phantom circuit at the exchange to produce current flow in said one direction to form a ringing signal, means for connecting the other of said sources to said other end of said phantom circuit to produce current flow in said other direction, and by means for switching between said two connecting means responsive to changes of supervisory signals, whereby supervision is provided over said phantom circuit.

8. An exchange system as claimed in claim 7, in which the connection of said two current sources is effected via two gates which are alternately turned on by a bistable circuit.

References Cited

UNITED STATES PATENTS

| | | | |
|---|---|---|---|
| 1,406,678 | 2/1922 | Mortimer | 179—43 |
| 3,023,278 | 2/1962 | James et al. | |
| 3,230,315 | 1/1966 | Judy et al. | |

KATHLEEN H. CLAFFY, Primary Examiner

T. W. BROWN, Assistant Examiner

U.S. Cl. X.R.

179—84